United States Patent
Park et al.

(10) Patent No.: US 11,572,061 B2
(45) Date of Patent: Feb. 7, 2023

(54) SYSTEM AND METHOD FOR CONTROLLING REMOTE PARKING ASSIST SYSTEM

(71) Applicants: Hyundai Motor Company, Seoul (KR); Kia Motors Corporation, Seoul (KR)

(72) Inventors: Sun-Young Park, Busan (KR); Oh-Eun Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 154 days.

(21) Appl. No.: 16/909,606

(22) Filed: Jun. 23, 2020

(65) Prior Publication Data

US 2021/0284134 A1    Sep. 16, 2021

(30) Foreign Application Priority Data

Mar. 16, 2020    (KR) .................... 10-2020-0032005

(51) Int. Cl.
*B60W 50/029*    (2012.01)
*B60W 30/06*    (2006.01)
(Continued)

(52) U.S. Cl.
CPC ............ *B60W 30/06* (2013.01); *B60W 10/06* (2013.01); *B60W 10/08* (2013.01); *B60W 10/18* (2013.01);
(Continued)

(58) Field of Classification Search
CPC ...... B60W 30/06; B60W 10/06; B60W 10/08; B60W 10/18; B60W 30/02; B60W 30/0956; B60W 40/02; B60W 40/08; B60W 50/029; B60W 50/045; B60W 2040/0881; B60W 2050/0292; B60W 2510/0657; B60W 2552/50; G05D 1/0011; G05D 1/0016; B60R 21/0134; B60Y 2300/06
See application file for complete search history.

(56) References Cited

U.S. PATENT DOCUMENTS 9,511,756 B2    12/2016   Nijakowski et al.
10,780,894 B2 *   9/2020   Ishigooka ............ B60W 30/06
(Continued)

FOREIGN PATENT DOCUMENTS

JP    2018-090042 A    6/2018
KR    2010-0074948 A   7/2010
(Continued)

*Primary Examiner* — Donald J Wallace
*Assistant Examiner* — Daniel M. Robert
(74) *Attorney, Agent, or Firm* — Fox Rothschild LLP

(57) ABSTRACT

A system for controlling a remote smart parking assist (RSPA) system is provided. The system includes an engine control unit (ECU) that is configured to operate an engine and an RSPA controller that is configured to receive vehicle state information from the ECU regarding whether or not a vehicle system error occurs and, if an error occurs, whether
(Continued)

or not the error is an error in which a vehicle is possible to be driven. The RSPA controller is further configured to transmit torque request information to the ECU when the vehicle system error is an error in which the vehicle is possible to be driven.

11 Claims, 2 Drawing Sheets

(51) Int. Cl.
    *B60W 10/06*     (2006.01)
    *B60W 10/18*     (2012.01)
    *B60W 50/04*     (2006.01)
    *B60W 40/08*     (2012.01)
    *B60W 30/095*     (2012.01)
    *G05D 1/00*     (2006.01)
    *B60W 10/08*     (2006.01)
    *B60W 30/02*     (2012.01)
    *B60W 40/02*     (2006.01)

(52) U.S. Cl.
    CPC ........ *B60W 30/02* (2013.01); *B60W 30/0956* (2013.01); *B60W 40/02* (2013.01); *B60W 40/08* (2013.01); *B60W 50/029* (2013.01); *B60W 50/045* (2013.01); *G05D 1/0011* (2013.01); *G05D 1/0016* (2013.01); *B60W 2040/0881* (2013.01); *B60W 2050/0292* (2013.01)

(56) References Cited

U.S. PATENT DOCUMENTS

| | | | |
|---|---|---|---|
| 2014/0074352 A1* | 3/2014 | Tate, Jr. | B62D 15/0285 |
| | | | 701/36 |
| 2015/0025732 A1 | 1/2015 | Min et al. | |
| 2018/0105165 A1* | 4/2018 | Alarcon | H04W 4/024 |
| 2018/0244283 A1* | 8/2018 | Geißenhöner | F16H 63/48 |
| 2018/0257665 A1* | 9/2018 | Sannodo | B62D 15/0285 |
| 2020/0191083 A1* | 6/2020 | Glugla | F02D 41/1454 |
| 2020/0290601 A1* | 9/2020 | Yamanaka | B60W 30/06 |
| 2021/0009091 A1* | 1/2021 | Koshiba | F16H 63/34 |
| 2021/0122362 A1* | 4/2021 | Okamura | G05D 1/0011 |
| 2021/0197812 A1* | 7/2021 | Watanabe | B60W 50/00 |
| 2021/0389158 A1* | 12/2021 | Koo | G01C 22/00 |

FOREIGN PATENT DOCUMENTS

| | | |
|---|---|---|
| KR | 101399736 B1 | 5/2014 |
| KR | 101463265 B1 | 11/2014 |
| KR | 101470099 B1 | 12/2014 |
| KR | 101711026 B1 | 3/2017 |
| KR | 2018-0105913 A | 10/2018 |

\* cited by examiner

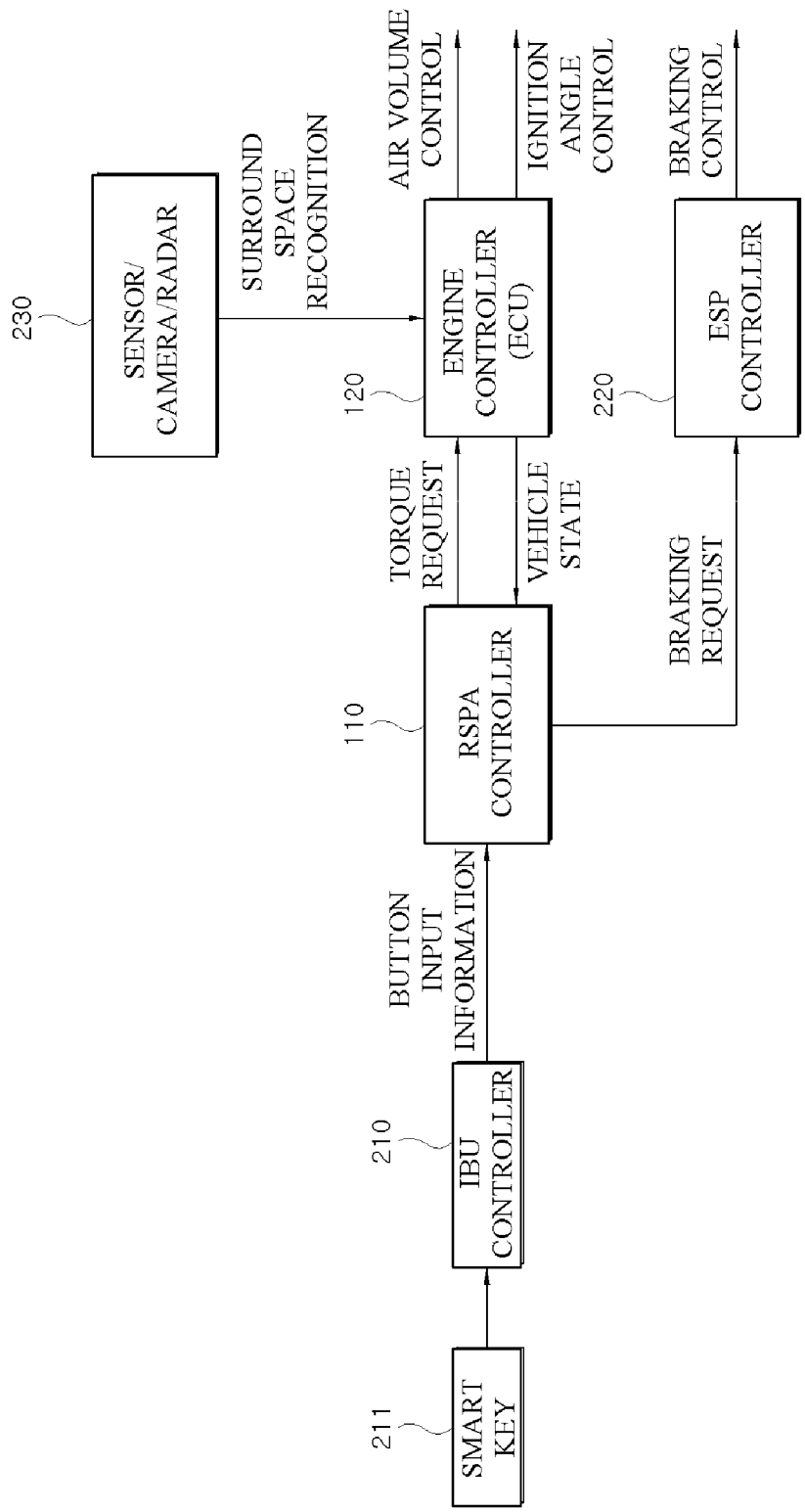

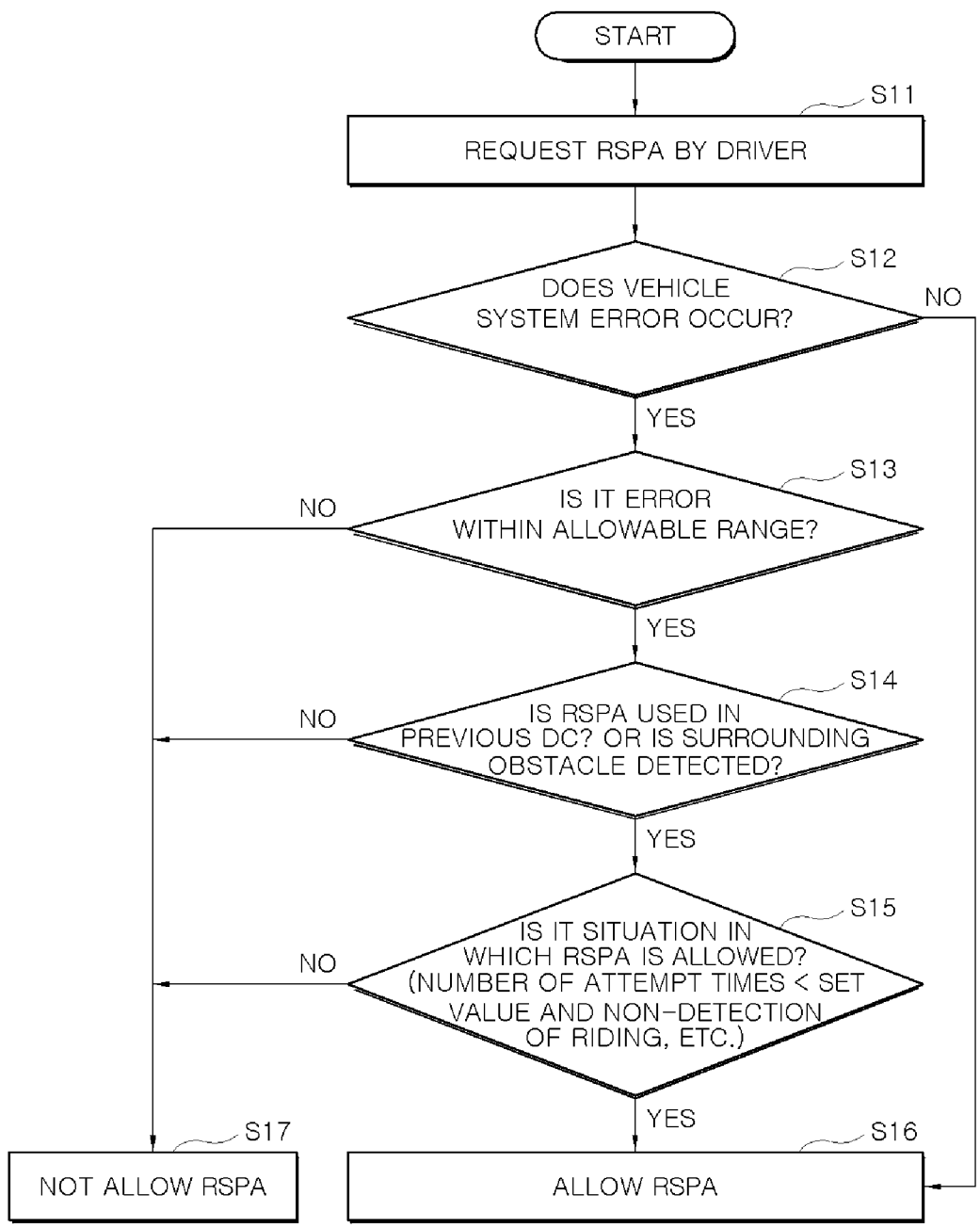

SYSTEM AND METHOD FOR CONTROLLING REMOTE PARKING ASSIST SYSTEM

CROSS-REFERENCE(S) TO RELATED APPLICATIONS

This application claims priority to Korean Patent Application No. 10-2020-0032005, filed on Mar. 16, 2020, which is incorporated herein by reference in its entirety.

BACKGROUND

Field of Disclosure

The present disclosure relates to a system and a method for controlling a remote smart parking assist (RSPA) system which assists parking of a vehicle.

Description of Related Art

A remote smart parking assist (RSPA) system is a system which assists a driver to conveniently perform parking. In other words, when a driver is exiting the vehicle and operates a remote controller such as a smart key, the RSPA system assists in the parking of the vehicle to even in a small parking space without requiring user intervention.

However, when the vehicle is parked in a small parking space in which it is difficult for the driver to remain within the vehicle due to restrictions of exiting the vehicle when parked, and requiring the vehicle to be moved again from the small space for the driver the enter the vehicle, there occurs a problem that, when an operation of the RSPA system is impossible due to a system error condition of the vehicle (e.g., an engine warning lamp is turned on), it is impossible for the driver to enter the vehicle and directly drive the vehicle. In other words, if a failure occurs in the vehicle causing failure of the RSPA system, the driver would be unable to access the vehicle.

A range of the vehicle system error condition is vast. In other words, there is a range in which driving is possible by limiting a performance of the vehicle without influencing the driving of the vehicle. For example, in a situation in which a short distance driving is possible, such as a limp-home mode, the vehicle may be driven but other performance thereof is limited. Therefore, when the vehicle is parked in a space in which the driver is unable to remain within the vehicle for exiting restrictions when parked and then the above system error condition occurs, a situation in which the vehicle is unable to be driven by the RSPA system may occur.

The contents described in the above are merely to help understanding of the background of the present disclosure and may include what is not previously known to a person of ordinary skill in the art to which the present disclosure pertains.

SUMMARY

An exemplary embodiment of the present disclosure is directed to a system and a method for controlling a remote smart parking assist (RSPA) system, which allow a vehicle to be driven by operating the RSPA system when a vehicle system error in which the vehicle is capable of being driven occurs. Other objects and advantages of the present disclosure can be understood by the following description and become apparent with reference to the embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, a system for controlling a remote smart parking assist (RSPA) system may include an engine control unit (ECU) configured to operate an engine; and an RSPA controller configured to receive vehicle state information including whether a vehicle system error in which a vehicle is possible to be driven occurs from the ECU and transmit torque request information to the ECU when the vehicle system error in which the vehicle is possible to be driven occurs.

Further, the system may further include a sensor configured to detect an obstacle around the vehicle, and the ECU may be configured to transmit information received from the sensor to the RSPA controller. The system may further include an electronic stability program (ESP) controller configured to perform vehicle braking control, and when the vehicle system error in which the vehicle is possible to be driven occurs, the RSPA controller may be configured to transmit braking request information to the ESP controller.

Additionally, the system may include an integrated body unit (IBU) controller configured to transmit input RSPA request information to the RSPA controller, and when the RSPA controller receives the RSPA request information from the IBU controller, the RSPA controller may be configured to determine whether the vehicle system error in which the vehicle is possible to be driven occurs. The vehicle state information may include information regarding whether the RSPA system is used in a previous driving cycle (DC), information regarding the number of attempt times for the RSPA system, and information regarding whether the driver is riding within the vehicle. Meanwhile, the vehicle system error in which the vehicle is possible to be driven may include an operation of a limp-home mode.

In accordance with another exemplary embodiment of the present disclosure, a method of controlling a remote smart parking assist (RSPA) system may include determining whether a vehicle system error occurs when RSPA request information is input; determining whether the vehicle system error is in an allowable range in which the vehicle is possible to be driven; and determining whether an RSPA is performed when the vehicle system error is in the allowable range in which the vehicle is possible to be driven. The determining of whether the RSPA is performed may include determining whether the RSPA is performed in a previous driving cycle (DC), and when the RSPA is determined as being performed in the previous DC, the RSPA may be performed.

After determining whether the RSPA is performed in the previous DC, the method may include comparing the number of attempt times for the RSPA with a set value, and when the number of attempt times for the RSPA is less than the set value, the RSPA may be performed. Further, after determining whether the RSPA is performed in the previous DC, the method may include detecting whether a driver is riding within the vehicle, and when the driver is not detected as being present within the vehicle, the RSPA may be performed.

Additionally, the determining of whether the RSPA is performed may include determining whether a surrounding obstacle is detected, and when the surrounding obstacle is detected, the RSPA may be performed. After determining whether the surrounding obstacle is detected, the method may include comparing the number of attempt times for the RSPA with a set value, and when the number of attempts for the RSPA is less than the set value, the RSPA may be performed.

Further, after determining whether the surrounding obstacle is detected, the method may include detecting whether a driver is riding within the vehicle, and when the driver is not detected as being present within the vehicle, the RSPA may be performed. Meanwhile, the vehicle system error in an allowable range in which the vehicle is possible to be driven may include an operation of a limp-home mode.

BRIEF DESCRIPTION OF THE DRAWINGS

The objects, features and advantages of the present disclosure will be more apparent from the following detailed description in conjunction with the accompanying drawings, in which:

FIG. 1 is a block diagram illustrating a system for controlling a remote smart parking assist (RSPA) system according to an exemplary embodiment of the present disclosure; and FIG. 2 is a diagram illustrating a method of controlling an RSPA system according to an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to fully understand the present disclosure and operational advantages of the present disclosure, reference should be made to the accompanying drawings that illustrate exemplary embodiments of the present disclosure, to the description in the accompanying drawings, and objects attained by practicing the present disclosure. In describing exemplary embodiments of the present disclosure, known technologies or detailed descriptions may be reduced or omitted to avoid obscuring appreciation of the disclosure by a person of ordinary skill in the art.

FIG. 1 is a block diagram illustrating a system for controlling a remote smart parking assist (RSPA) system according to the present disclosure, and FIG. 2 is a diagram illustrating a method of controlling an RSPA system according to the present disclosure. Hereinafter, a system and a method for controlling an RSPA system according to an exemplary embodiment of the present disclosure will be described with reference to FIGS. 1 and 2.

In accordance with the present disclosure, when a vehicle system error (e.g., battery depletion, system malfunctions within vehicle, or the like) in an allowable range in which a vehicle is possible to be driven occurs, the system and the method for operating an RSPA system determine it is difficult for a driver to operate the vehicle to control the RSPA system. Accordingly, an RSPA controller 110 and an engine control unit (ECU) 120 may be included in the system, and these may be configured as a single RSPA control device.

Thus, the RSPA controller 110 may be configured to receive vehicle state information from the ECU 120 and operate the ECU 120 and an electronic stability program (ESP) controller 220 according to vehicle state information, thereby allowing driving for RSPA. The ESP controller 220 is a controller configured to operate an electronic parking brake (EPB), an electronic stability control (ESC), and the like to operate the RSPA system.

First, the RSPA controller 110 may be configured to determine whether to perform the RSPA based on input information from the integrated body unit (IBU) controller 210. The IBU controller 210 may be a controller in which a body control unit (BCM), a smart key system (SMK), and a tire pressure monitoring system (TPMS) are integrated and configured to communicate with separate controllers for operating wipers, headlamps, and power seats to integrally operate electrical and electronic parts of a vehicle body. In the present disclosure, the IBU controller 210 may be configured to receive a signal from a smart key 211 and transmit input information to the RSPA controller 110.

The ECU 120 may be configured to transmit vehicle state information, which includes information received from sensor units such as a sensor, a camera, and a radio detection and ranging (RADAR) 230, to the RSPA controller 110. When a vehicle system error in which the vehicle is possible to be driven is detected (e.g., a vehicle system error is detected but the vehicle is determined to still be capable of being driven), the RSPA controller 110 may be configured to determine whether to operate the RSPA based on the input information from the IBU controller 210 and the vehicle state information from the ECU 120. Consequently, when the RSPA system is applied and operated, torque request information may be transmitted to the ECU 120, and braking request information may be transmitted to the ESP controller 220 to thus drive the vehicle. Thus, the ECU 120 may be configured to perform air volume control and ignition angle control, and the ESP controller 220 may be configured to perform braking control.

The vehicle state information, which the RSPA controller 110 receives from the ECU 120 for the above controls, may include information regarding whether a vehicle system error occurs, information regarding whether a corresponding vehicle system error is a vehicle system error in an allowable range in which the vehicle is possible to be driven, information regarding whether an RSPA system is used in a previous driving cycle (DC), information regarding whether a surrounding obstacle is detected based on surrounding space recognition information from the sensor 230, information regarding the number of attempt times for the RSPA system, and information regarding whether the driver is present within the vehicle.

Thus, in a situation in which a vehicle system error in which the vehicle is possible to be driven, the RSPA system is used in the previous DC, the surrounding obstacle is detected, the number of attempt times for the RSPA system is less than a set value, or the driver is not detected to be present within the vehicle, the RSPA system may be allowed or operated to control the ECU 120 and the ESP controller 220 to thus drive the vehicle. The determination of whether the driver is present within the vehicle by the ECU 120 may be performed by determining whether a seat belt is engaged, whether a seat weight greater than a predetermined threshold is detected, whether a pedal is engaged, or whether other buttons related to vehicle functions within the vehicle are operated or manipulated.

Referring to FIG. 2, a method of controlling an RSPA system according to the present disclosure will be described. First, when an RSPA system is requested by the driver (S11), whether a vehicle system error occurs may be determined (S12). RSPA system request information by the driver may be determined based on input information from the IBU controller 210 due to an operation such as the smart key 211 or the like. The RSPA controller 110 may be configured to determine whether the vehicle system error occurs based on the vehicle state information received from the ECU 120.

Further, the RSPA controller 110 may be configured to determine whether the occurred vehicle system error is an error within an allowable range (S13). The vehicle system error in the allowable range refers to an error in a state in which the vehicle is possible to be driven. In other words, the vehicle system error corresponds to a limp-home mode in which a vehicle may be driven by removing an influence on actual vehicle driving or limiting vehicle performance. Then, the RSPA controller 110 may be configured to determine whether the RSPA system is used in the previous DC or the surrounding obstacle is detected (S14).

When the RSPA system is used in the previous DC, the vehicle may be difficult to be driven when the RSPA system is not used, and, this may be determined as a condition in which, when the surrounding obstacle is not detected, the vehicle may be possible to be driven without allowing the RSPA system.

As described above, when the RSPA system is determined as being required, the RSPA controller 110 may be configured to determine a situation whether the RSPA system should be allowed based on the number of attempt times for the RSPA system and the detection whether the driver is present within the vehicle (S15). In other words, the RSPA controller 110 may be configured to determine whether the RSPA system should be allowed. In particular, when the number of attempt times for the RSPA system is greater than or equal to the set value, excessive use of the RSPA system may be restricted, and, when the driver is detected as being present within the vehicle, the driver may be determined to be in a state of being capable of driving the vehicle and thus, the use of the RSPA system may be restricted. For example, the set value may be three times.

As described above, when the vehicle system error in which the vehicle is possible to be driven occurs as the determination result in S13, the RSPA system is used in the previous DC or the surrounding obstacle is detected as the determination result in S14, and the number of attempt times for the RSPA system is less than the set value and the driver is determined as not being present within the vehicle as the determination result in S15, the RSPA controller 110 may be configured to operate the RSPA system in S16, transmit the torque request information to the ECU 120, and transmit the braking request information to the ESP controller 220.

However, when the vehicle system error in which the vehicle is possible to be driven does not occur as the determination result in S13, the RSPA system is not used in the previous DC or the surrounding obstacle is not detected as the determination result in S14, and the number of attempt times for the RSPA system is greater than or equal to the set value and the driver is determined as being present within the vehicle as the determination result in S15, the RSPA controller 110 may be configured to restrict operation of the RSPA system.

In accordance with the present disclosure, whether a driver is in a situation in which it is difficult for the driver to move a vehicle during parking may be determined, and, when a system error in an allowable range occurs, the vehicle may be driven using a remote smart parking assist (RSPA) system to thus increase driver convenience.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A system for controlling a remote smart parking assist (RSPA) system, comprising:
    an engine control unit (ECU) configured to operate an engine; and
    an RSPA controller configured to:
        receive vehicle state information including whether a vehicle system error in which vehicle driving is possible occurs from the ECU; and
        transmit torque request information to the ECU in response to determining that the vehicle system error occurs;

wherein the vehicle state information includes information regarding whether the RSPA was used in a previous driving cycle (DC), information regarding the number of attempt times for the RSPA, and information regarding whether the driver is present within the vehicle; and wherein the RSPA controller is further configured to:
determine whether or not the RSPA was performed in a previous driving cycle (DC);
perform the RSPA when the RSPA is determined as being performed in the previous DC; and
restrict the RSPA when the RSPA is determined as being not performed in the previous DC.

2. The system of claim 1, further comprising:
a sensor configured to detect an obstacle around the vehicle,
wherein the ECU is configured to transmit information received from the sensor to the RSPA controller.

3. The system of claim 1, further comprising:
an electronic stability program (ESP) controller configured to perform vehicle braking control,
wherein, in response to detecting the vehicle system error, the RSPA controller may be configured to transmit braking request information to the ESP controller.

4. The system of claim 1, further comprising:
an integrated body unit (IBU) controller configured to transmit input RSPA request information to the RSPA controller,
wherein, in response to the RSPA controller receiving the RSPA request information from the IBU controller, the RSPA controller may be configured to determine whether the vehicle system error occurs.

5. The system of claim 1, wherein the vehicle system error includes an operation of a limp-home mode.

6. A method of controlling a remote smart parking assist (RSPA) system, comprising:
determining, by a controller, whether a vehicle system error occurs when RSPA request information is input;
determining, by the controller, whether the vehicle system error is in an allowable range in which the vehicle is capable of being driven; and
determining, by the controller, whether an RSPA was performed when the vehicle system error is in the allowable range, wherein the determining of whether the RSPA was performed includes determining whether the RSPA was performed in a previous driving cycle (DC);
performing, by the controller, the RSPA when the RSPA is determined as being performed in the previous DC; and
restricting, by the controller, the RSPA when the RSPA is determined as being not performed in the previous DC.

7. The method of claim 6, further comprising:
after the determining of whether the RSPA was performed in the previous DC, comparing, by the controller, the number of attempt times for the RSPA with a set value;
in response to determining that the number of attempt times for the RSPA is less than the set value, performing, by the controller, the RSPA.

8. The method of claim 6, further comprising:
after the determining of whether the RSPA was performed in the previous DC, detecting, by the controller, whether a driver is present within the vehicle,
in response to determining that the driver is not present within the vehicle, performing, by the controller, the RSPA.

9. The method of claim 6, wherein the vehicle system error in an allowable range in which the vehicle is capable of being driven includes an operation of a limp-home mode.

10. A method of controlling a remote smart parking assist (RSPA) system, comparing:
determining, by a controller, whether a vehicle system error occurs when RSPA request information is input;
determining, by the controller, whether the vehicle system error is in an allowable range in which the vehicle is capable of being driven; and
determining, by the controller, whether an RSPA was performed when the vehicle system error is in the allowable range, wherein the determining of whether the RSPA was performed includes determining, by the controller, whether or not a surrounding obstacle is detected; and in response to detecting the surrounding obstacle, performing, by the controller, the RSPA;
comparing, by the controller, the number of attempt times for the RSPA with a set value after determining whether or not the surrounding obstacle is detected; and
performing, by the controller, the RSPA in response to determining that the number of attempt times for the RSPA is less than the set value.

11. The method of claim 10, further comprising:
after the determining of whether or not the surrounding obstacle is detected, detecting, by the controller, whether a driver is present within the vehicle;
in response to determining that the driver is not present within the vehicle, performing, by the controller, the RSPA.

* * * * *